us010447998B2

United States Patent
Oshrat et al.

(10) Patent No.: US 10,447,998 B2
(45) Date of Patent: Oct. 15, 2019

(54) POWER EFFICIENT LONG RANGE DEPTH SENSING

(71) Applicant: Intel Corporation, Santa Clara, CA (US)

(72) Inventors: Yinon Oshrat, Neve Daniel (IL); Dagan Eshar, Tel Aviv-Jaffa (IL); Yaron Yanai, Modiin (IL)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 15/282,344

(22) Filed: Sep. 30, 2016

(65) Prior Publication Data

US 2018/0098050 A1    Apr. 5, 2018

(51) Int. Cl.
*H04N 13/00* (2018.01)
*H04N 13/254* (2018.01)
*H04N 13/207* (2018.01)
*H04N 13/296* (2018.01)
*H04N 5/225* (2006.01)
*G01S 1/00* (2006.01)
*G01S 17/46* (2006.01)
*G01S 11/12* (2006.01)

(52) U.S. Cl.
CPC .............. *H04N 13/254* (2018.05); *G01S 1/00* (2013.01); *G01S 11/12* (2013.01); *G01S 17/46* (2013.01); *H04N 5/2256* (2013.01); *H04N 13/207* (2018.05); *H04N 13/296* (2018.05)

(58) Field of Classification Search
None
See application file for complete search history.

(56) References Cited

U.S. PATENT DOCUMENTS

| 2014/0267631 | A1 | 9/2014 | Powers et al. |
| 2015/0146926 | A1* | 5/2015 | Ramachandran .. G06K 9/00624 382/103 |
| 2015/0294499 | A1* | 10/2015 | Wagner ................... G06T 17/00 348/46 |
| 2016/0104019 | A1 | 4/2016 | Todeschini et al. |

FOREIGN PATENT DOCUMENTS

WO    2012106068 A2    8/2012

OTHER PUBLICATIONS

International Search Report and Written Opinion for International Patent Application No. PCT/US2017/049299, dated Dec. 11, 2017, 17 pages.
International Preliminary Report on Patentability for International Patent Application No. PCT/US2017/049299, dated Apr. 11, 2019, 13 pages.

* cited by examiner

*Primary Examiner* — Anand S Rao
*Assistant Examiner* — Tyler B Edwards
(74) *Attorney, Agent, or Firm* — Jordan IP Law, LLC

(57) ABSTRACT

Systems, apparatuses and methods may provide for detecting a snapshot request to conduct a long range depth capture, wherein the snapshot request is associated with a short range depth capture. Additionally, an infrared (IR) projector may be activated at a first power level for a first duration in response to the snapshot request, wherein the first power level is greater than a second power level corresponding to the short range depth capture and the first duration is less than a second duration corresponding to the short range depth capture.

25 Claims, 4 Drawing Sheets

POWER EFFICIENT LONG RANGE DEPTH SENSING

TECHNICAL FIELD

Embodiments generally relate to depth sensing. More particularly, embodiments relate to power efficient long range depth sensing.

BACKGROUND

Depth sensing may be used to enhance photos with advanced filters and algorithms. For example, a depth-enabled camera may include a projector that illuminates scenes with infrared (IR) light in order to capture depth information. The power consumption of the IR projector may be minimized in conventional depth-enabled cameras in an effort to extend battery life. The low power operation, however, may in turn cause the range of the IR projector to be relatively low, which may ultimately lead to suboptimal performance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
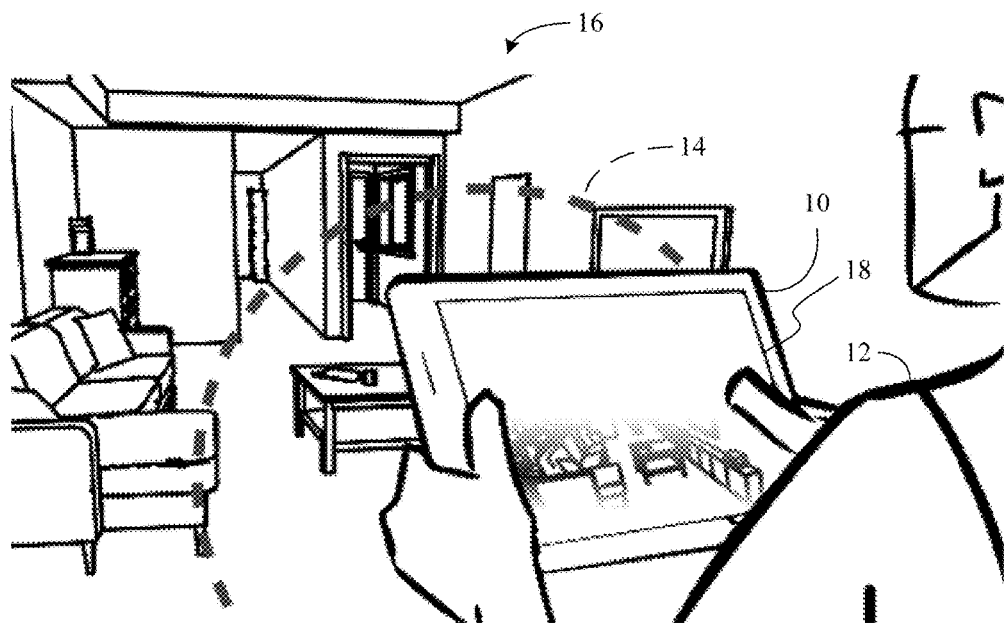
FIGS. 1A and 1B are illustrations of examples of short range and long range depth captures, respectively, according to embodiments.

Turning now to FIG. 1A, a short range depth capture is shown in which a mobile photography computing system 10 (e.g., tablet computer, convertible tablet, smart phone, handheld camera, personal digital assistant/PDA, wearable device, drone) is operated by a user 12. The computing system 10 may generally capture color information (e.g., red-green-blue/RGB data) and depth information for each pixel in an image of a scene 16 located behind the computing system 10, wherein the captured content may include still image data (e.g., snapshots, photos, pictures, individual frames) and/or video data (e.g., multiple frames). As will be discussed in greater detail, the computing system 10 may use one or more infrared (IR) projectors (not shown) to illuminate the scene 16 with IR light having a particular pattern (e.g., static or dynamic). The computing system 10 may also include one or more three-dimensional (3D) sensors (not shown) that generate depth information/images based on the patterns of IR light detected in the scene 16.

In the illustrated example, the system 10 is operated in a relatively low power mode that results in a limited depth information range 14. The low power mode may in turn result in a relatively low quality depth output being presented on a display 18 of the computing system 10. As will be discussed in greater detail, the low power mode and limited depth information range 14 may be implemented during preview video captures (e.g., continual operation) in order to minimize/reduce power consumption and/or extend battery life in the computing system 10.

Figure 1B:
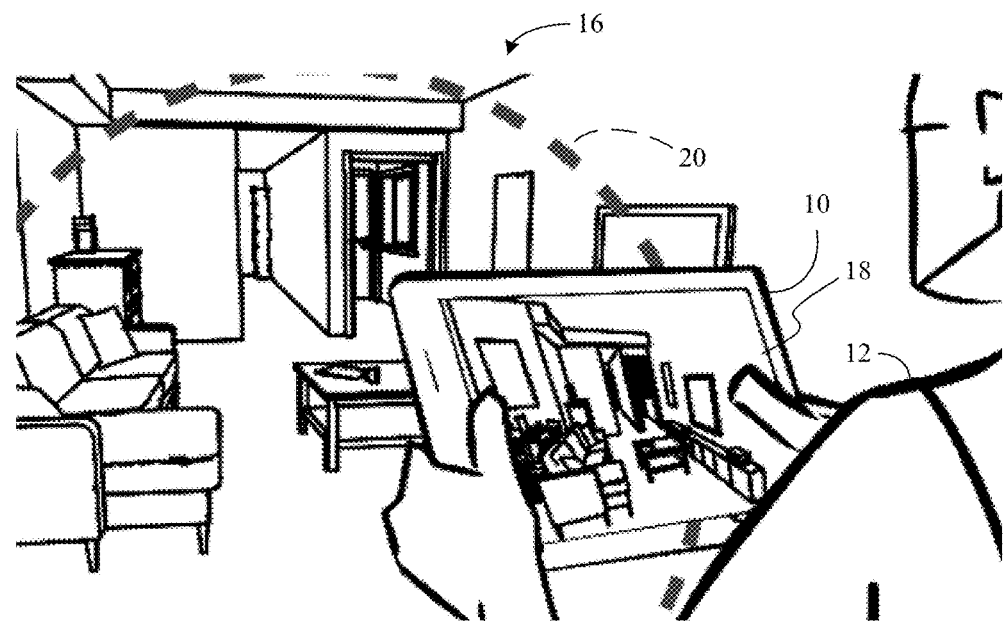

FIG. 1B demonstrates that a long range depth capture may be automatically conducted by the computing system 10 during the capture of still images and/or relatively short video clips. More particularly, the illustrated system 10 is operated in a relatively high power mode that results in a broader depth information range 20. Accordingly, a relatively high quality depth output (e.g., containing more detail) may be presented on the display 18 of the computing system 10 during the high power mode. Due to the limited duration of the high power mode, the impact on power consumption and/or battery life may continue to be minimal in the illustrated example.

Figure 2:
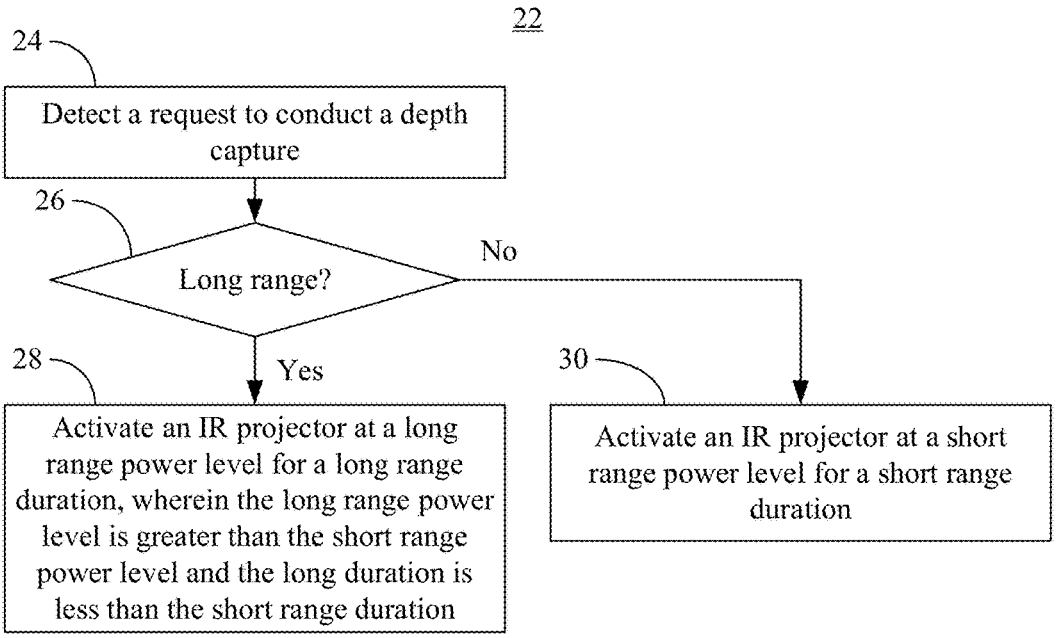
FIG. 2 is a flowchart of an example of a method of illuminating a scene according to an embodiment.

FIG. 2 shows a method 22 of illuminating a scene. The method 22 may generally be implemented in a computing system such as, for example, the mobile photography computing system 10 (FIGS. 1A and 1B), already discussed. More particularly, the method 22 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

Illustrated processing block 24 detects a request to conduct a depth information capture (e.g., "depth capture"), wherein a determination may be made at block 26 as to whether the request is for a long range depth capture. The request may be received from a user interface (UI) device, local application/component, remote device (e.g., handheld remote control, separate image analysis platform), etc., or any combination thereof. For example, operation of the computing system may generally involve time periods of continual "preview" captures of depth information interspersed with shorter time periods (e.g., momentary, instantaneous) of snapshot captures of depth information. Thus, snapshot requests might be detected via signals from a shutter release button (e.g., hard or soft) activation corresponding to still depth capture events, whereas preview requests may be detected via signals from an application processor (e.g., indicating a preview mode of operation) corresponding to video capture events.

If it is determined at block 26 that a snapshot request to conduct a long range depth capture has been detected, illustrated block 28 activates an IR projector at a long range power level for a long range duration. The long range power level may generally be greater than a short range power level corresponding to the short range depth capture (e.g., continual preview mode power level) and the long range duration may generally be less than a short range duration corresponding to the short range depth capture (e.g., continual preview mode duration). Thus, although block 28 sets the power level of the IR projector at a relatively high value, the setting is only momentary so that battery life is not substantially depleted. If, on the other hand, it is determined at block 26 that a preview request to conduct a short range depth capture has been received, block 30 may activate the IR projector at the short range power level for the short range duration.

As will be discussed in greater detail, the IR projector activated in block 30 may be the same as or different from the IR projector activated in block 28. Moreover, the IR projectors activated in blocks 28 and 30 may be located on the same or different platforms. For example, the short range IR projector activated in block 30 might reside in a mobile device such as, for example, a tablet computer, convertible tablet, smart phone, dedicated camera, etc., whereas the long range IR projector activated in block 28 might reside in a dedicated depth illumination device (e.g., mounted to a robot, drone or elsewhere in the environment).

Additionally, blocks 28 and 30 may cause the IR projector(s) to illuminate the scene with a specific IR light pattern that may be dynamic and/or static. For example, an assisted stereoscopic IR light pattern might be static (e.g., specific arrangement of dots, colors, lines, etc., that do not change over time), whereas a structured or time-of-flight IR light pattern may be dynamic (e.g., specific arrangement of dots, colors, lines, etc., that change over time). In addition, the type of pattern may be relevant to whether the IR projector(s) are positioned on different platforms. For example, in the case of assisted stereoscopic IR light patterns, block 28 may activate a remote IR projector in order to achieve an appropriate stereoscopic effect, whereas either a single IR projector or multiple IR projectors integrated onto the same platform may be used to generate structured IR light patterns or time-of-flight IR light patterns. In this regard, integration onto the same platform may be particularly advantageous from a calibration and/or synchronization standpoint when dynamic patterns are used. Each IR projector may also emit an IR light pattern that is specific to the projector in question.

Alternatively, the high-power operation time might not be shorter than the low-power operating time. For example, the low-range projector may be chosen for relatively short period of time in order to photograph a simple near-by, indoor, static scene, and still achieve very good depth information. Moreover, the high-power projector might be used for long video sequences of a faraway scene, while being directly powered by an electricity system/grid (e.g., a video photographer recording outside in the dark, while using very powerful light projectors for which battery issues are not a concern).

Figure 3:
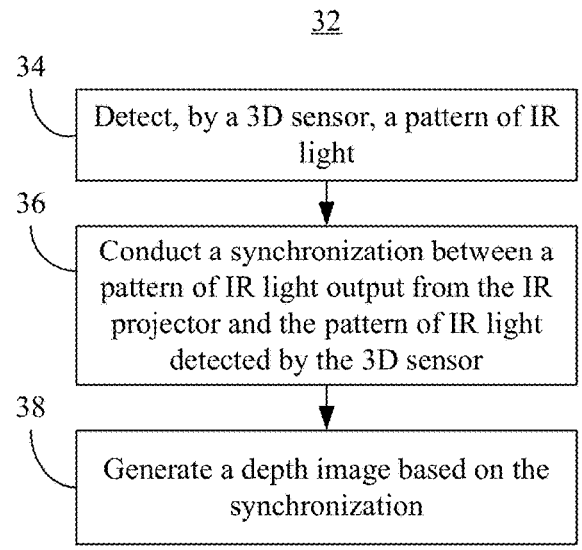
FIG. 3 is a flowchart of an example of a method of collecting depth information for an illuminated scene according to an embodiment.

FIG. 3 shows a method 32 of collecting depth information for an illuminated scene. The method 32 may also be implemented in a computing system such as, for example, the mobile photography computing system 10 (FIGS. 1A and 1B), already discussed. More particularly, the method 32 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS, TTL technology, or any combination thereof.

Illustrated processing block 34 provides for detecting, by one or more 3D sensors, a pattern of IR light in a scene. A synchronization may be conducted at block 36 between a pattern of light output from an IR projector and the pattern of IR light detected by the 3D sensor. Block 36 may include, for example, comparing and/or aligning two separate arrangements of dots, lines, colors, etc., in order to determine the distance between various objects in the scene and the 3D sensor, wherein the patterns may be static or dynamic, depending on the circumstances. Thus, block 36 may implement time-of-flight, structured light, assisted stereoscopic or other techniques in order to conduct the synchronization. One or more depth images may be generated at block 38 based on the synchronization. The depth image(s) may be used to enhance color information associated with the illuminated scene. For example, the information in the depth image(s) might facilitate photo manipulations such as segmenting foreground objects from background objects (e.g., and applying different color/grayscale filters to each object), applying parallax effects (e.g., using a single image), inserting virtual objects into a photo while preserving real world occlusions, measuring real-world distances, and so forth.

Figure 4A:
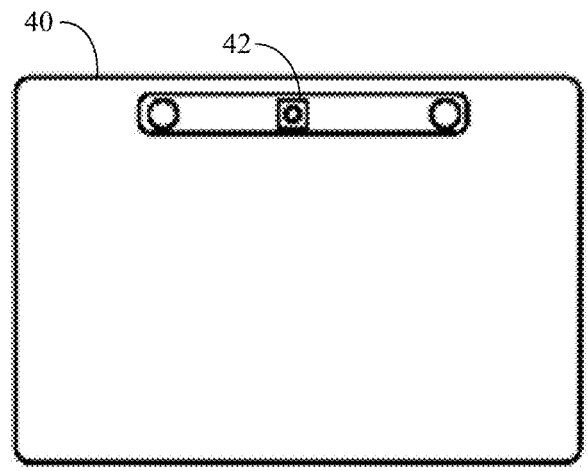
FIGS. 4A-4C are illustrations of examples of mobile photography computing systems according to embodiments.

FIG. 4A shows a computing system 40 that includes an internal IR projector 42. The illustrated IR projector 42 is capable of operating as both a high power emitter (e.g., during long range capture events) and a low power emitter (e.g., during short range capture events). The illustrated computing system 40 may be particularly suitable in dynamic pattern (e.g., structured and/or time-of-flight IR light pattern) scenarios in which an integrated platform may simplify calibration and synchronization between the IR projector 42 and the 3D sensor (not shown). Indeed, calibration might be conducted during the manufacture of the computing system 40.

Figure 4B:
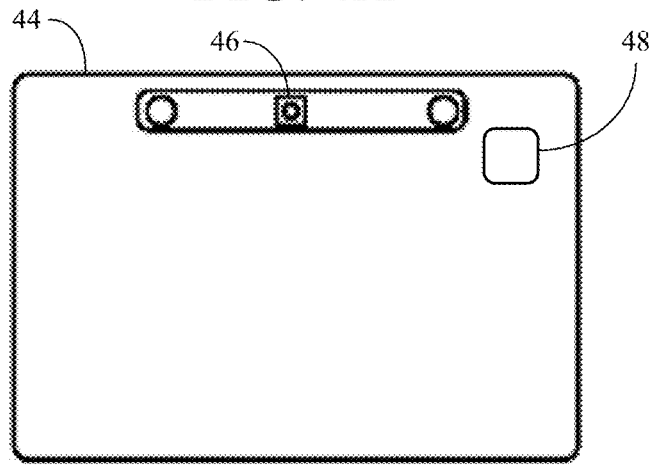

FIG. 4B shows another computing system 44 that includes low a power IR projector 46 and a dedicated high power IR projector 48, wherein each of the projectors 46, 48 are internal to a common platform. Thus, the low power IR projector 46 may be activated during short range capture events and the high power IR projector 48 may be activated during long range capture events. In one example, the high power IR projector 48 operates as a visible light flash in addition to an IR light emitter. The illustrated computing system 40 may also be suitable in dynamic pattern (e.g., structured and/or time-of-flight IR light pattern) scenarios in which an integrated platform may simplify calibration and synchronization between the high power IR projector 48 and the 3D sensor (not shown). Additionally, calibration might be conducted during the manufacture of the computing system 44.

Figure 4C:
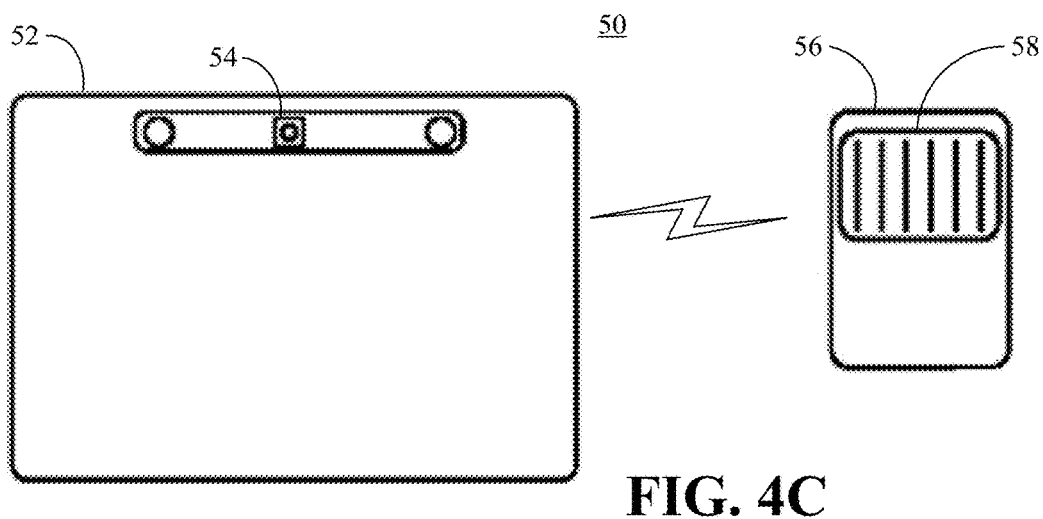

FIG. 4C shows yet another computing system 50 in which a first platform 52 (e.g., tablet computer, convertible tablet, smart phone, handheld camera, PDA, wearable device, drone) includes a low power IR projector 54 and one or more second platform(s) 56 (e.g., dedicated depth illumination device, robot or other remote/external device) include a dedicated high power IR projector 58. The first and second platforms 52, 56 may communicate via a wireless and/or wired link. The illustrated computing system 50 may be suitable in static pattern (e.g., stereoscopic IR light pattern) scenarios in which calibration and synchronization between the high power IR projector 58 and the 3D sensor (not shown) is less complex (e.g., on-off timing).

In this case, calibration may be conducted each time the second platform(s) 56 are connected to the first platform 52. More particularly, the calibration might involve taking an image of the same environment with the low power IR projector 54 and the high power IR projector 58, calculating the spatial 3D structure, and calculating the position of the high power IR projector 58 relative to the 3D sensor based on the spatial 3D structure.

Figure 5:
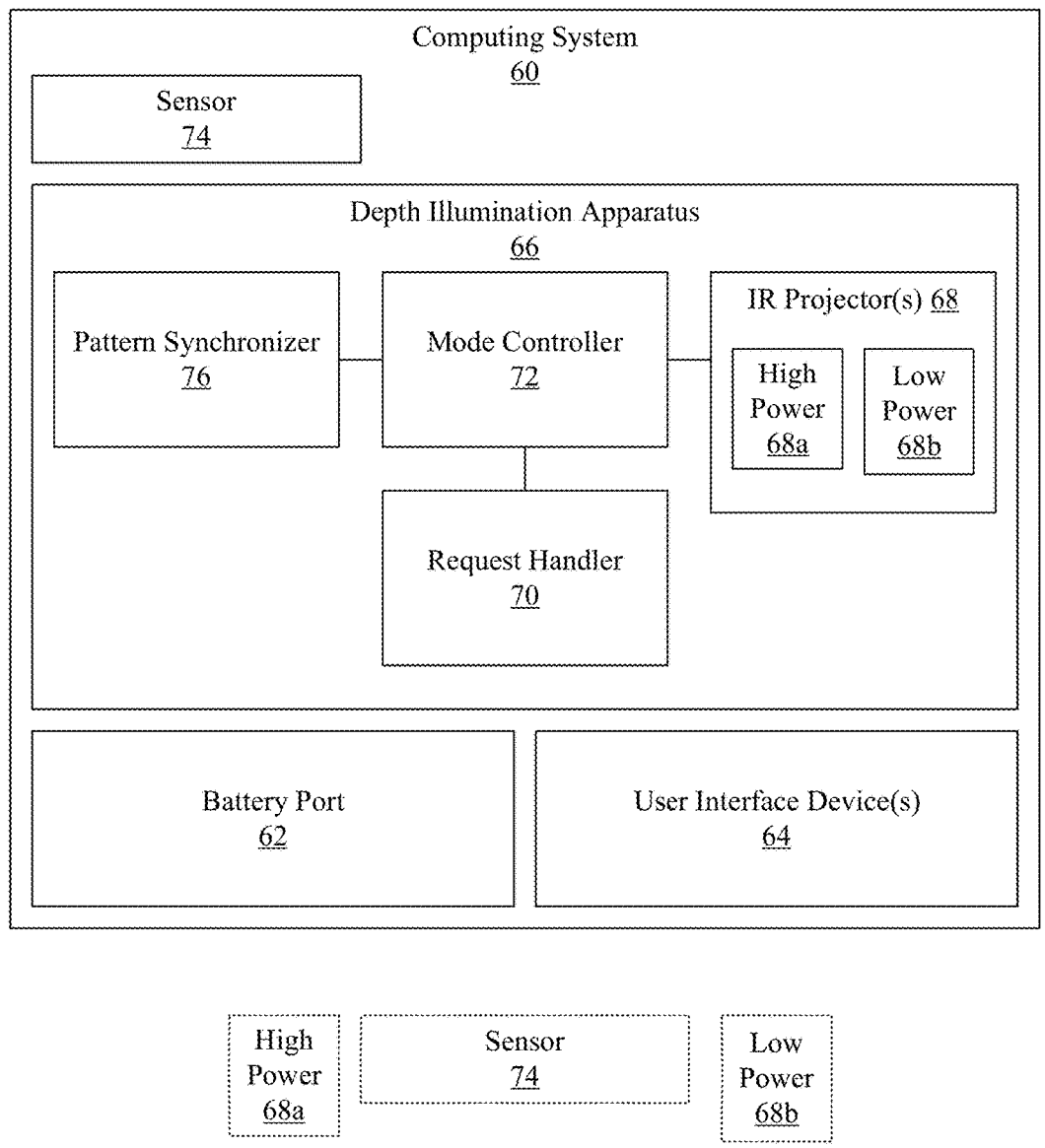
FIG. 5 is a block diagram of an example of a computing system according to an embodiment.

Turning now to FIG. 5, a computing system 60 is shown. The system 60 may generally be part of a notebook computer, tablet computer, convertible tablet, smart television (TV), PDA, mobile Internet device (MID), smart phone, wearable device, drone, robot, media player, etc., or any combination thereof. The computing system 60 may be readily substituted for the computing system 10 (FIGS. 1A and 1B), the computing system 40 (FIG. 4A), the computing system 44 (FIG. 4B) and/or the computing system 50 (FIG. 4C). Thus, the computing system 60 might include a housing having a mobile form factor, a battery port 62 to supply power to the system 60, one or more user interface (UI) devices 64 (e.g., keyboard, keypad, touch pad, touch screen, microphone, camera, display, speaker) that enable a user to interact with the system 60 and a depth illumination apparatus 66.

The depth illumination apparatus 66, which may include logic instructions, configurable logic, fixed-functionality logic hardware, etc., or any combination thereof, may generally implement one or more aspects of the method 22 (FIG. 2) and/or the method 32 (FIG. 3). In the illustrated example, the depth illumination apparatus 66 includes one or more IR projectors 68 (68a, 68b) and a request handler 70 to detect a snapshot request to conduct a long range depth capture, wherein the snapshot request is associated with a short range depth capture (e.g., a previous or subsequent preview video capture during a recording session that also includes the long range depth capture). The depth illumination apparatus 66 may also include a mode controller 72 communicatively coupled to the IR projector(s) 68 and the request handler 70. The mode controller 72 may activate a high power component 68a of the IR projector(s) 68 at a first power level for a first duration in response to the snapshot request. As already noted, the first power level may be greater than a second power level corresponding to the short range depth capture and the first duration may be less than a second duration corresponding to the short range depth capture. The long range depth capture may correspond to a still depth capture event and the short range depth capture may correspond to a video capture event.

The request handler 70 may also detect a preview request to conduct the short range depth capture, wherein the mode controller 72 may activate either the IR projector(s) 68 in low power mode (see, FIG. 4A) or a low power component 68b of the IR projector(s) 68 (see, FIG. 4B) at the second power level for the second duration in response to the preview request.

If the computing system 60 is a separate platform such as, for example, the second platform(s) 56 (FIG. 4C), the snapshot request may be detected based on a signal from a remote device such as, for example, the first platform 52 (FIG. 4C). In such a case, the IR projector(s) 68 might be configured to output stereoscopic light patterns or other static patterns. Moreover, the remote device may include the low power component 68b of the IR projectors 68 and a 3D sensor 74 to detect patterns of IR light.

If, on the other hand, the computing system 60 is an integrated platform such as, for example, the computing system 40 (FIG. 4A) and/or the computing system 44 (FIG. 4B), the UI device(s) 64 may function as local components that issue one or more signals, wherein the snapshot request is detected based on the signal(s) from the UI device(s) 64. In such a case, the IR projector(s) 68 might be configured to output structured IR light patterns, time-of-flight IR light patterns or other dynamic patterns. Thus, the computing system 60 may include the 3D sensor 74 and a pattern synchronizer 76 to conduct a synchronization between the patterns of light output from the IR projector(s) 68 and the patterns of light detected by the 3D sensor 74.

ADDITIONAL NOTES AND EXAMPLES

Example 1 may include a depth illumination apparatus comprising a local component to issue a signal, an infrared (IR) projector, a request handler to detect a snapshot request to conduct a long range depth capture based on the signal from the local component, a mode controller communicatively coupled to the IR projector and the request handler, the mode controller to activate the IR projector at a first power level for a first duration in response to the snapshot request, wherein the first power level is to be greater than a second power level corresponding to a short range depth capture and the first duration is to be less than a second duration corresponding to the short range depth capture, a three-dimensional (3D) sensor to detect a pattern of IR light, and a pattern synchronizer to conduct a synchronization between a pattern of IR light output from the IR projector and the pattern of light detected by the 3D sensor.

Example 2 may include the apparatus of Example 1, wherein the IR projector is to output one of a structured IR light pattern or a time-of-flight IR light pattern.

Example 3 may include the apparatus of any one of Examples 1 or 2, wherein the request handler is to detect a preview request to conduct the short range depth capture and the mode controller is to activate the IR projector at the second power level for the second duration in response to the preview request.

Example 4 may include the apparatus of Example 1, wherein the IR projector is a dedicated high power IR projector and the apparatus further includes a dedicated low power IR projector, the request handler is to detect a preview request to conduct the short range depth capture, and the mode controller is to activate the dedicated low power IR projector at the second power level for the second duration in response to the preview request.

Example 5 may include a mobile photography computing system comprising a housing including a mobile form factor, a battery port to supply power to the system, and a depth illumination apparatus including—an infrared (IR) projector—a request handler to detect a snapshot request to conduct a long range depth capture, wherein the snapshot request is to be associated with a short range depth capture, and a mode controller communicatively coupled to the IR projector and the request handler, the mode controller to activate the IR projector at a first power level for a first duration in response to the snapshot request, wherein the first power level is to be greater than a second power level corresponding to the short range depth capture and the first duration is to be less than a second duration corresponding to the short range depth capture.

Example 6 may include the system of Example 5, wherein the long range depth capture is to correspond to a still depth capture event and the short range depth capture is to correspond to a video capture event.

Example 7 may include the system of any one of Examples 5 or 6, wherein the snapshot request is to be detected based on a signal from a remote device and the IR projector is to output a stereoscopic IR light pattern.

Example 8 may include the system of any one of Examples 5 or 6, wherein the depth illumination apparatus further includes a local component to issue a signal, wherein the snapshot request is to be detected based on the signal from the local component, a three-dimensional (3D) sensor to detect a pattern of IR light, and a pattern synchronizer to conduct a synchronization between a pattern of IR light output from the IR projector and the pattern of light detected by the 3D sensor.

Example 9 may include the system of Example 8, wherein the IR projector is to output one of a structured IR light pattern or a time-of-flight IR light pattern.

Example 10 may include the system of Example 5, wherein the request handler is to detect a preview request to conduct the short range depth capture and the mode controller is to activate the IR projector at the second power level for the second duration in response to the preview request.

Example 11 may include the system of Example 5, wherein the IR projector is a dedicated high power IR projector and the depth illumination apparatus further includes a dedicated low power IR projector, the request handler is to detect a preview request to conduct the short range depth capture, and the mode controller is to activate the dedicated low power IR projector at the second power level for the second duration in response to the preview request.

Example 12 may include a depth illumination apparatus comprising an infrared (IR) projector, a request handler to detect a snapshot request to conduct a long range depth capture, wherein the snapshot request is to be associated with a short range depth capture, and a mode controller communicatively coupled to the IR projector and the request handler, the mode controller to activate the IR projector at a first power level for a first duration in response to the snapshot request, wherein the first power level is to be greater than a second power level corresponding to the short range depth capture and the first duration is to be less than a second duration corresponding to the short range depth capture.

Example 13 may include the apparatus of Example 12, wherein the long range depth capture is to correspond to a still depth capture event and the short range depth capture is to correspond to a video capture event.

Example 14 may include the apparatus of any one of Examples 12 or 13, wherein the snapshot request is to be detected based on a signal from a remote device and the IR projector is to output a stereoscopic IR light pattern.

Example 15 may include the apparatus of any one of Examples 12 or 13, further including a local component to issue a signal, wherein the snapshot request is to be detected based on the signal from the local component, a three-dimensional (3D) sensor to detect a pattern of IR light, and a pattern synchronizer to conduct a synchronization between a pattern of IR light output from the IR projector and the pattern of light detected by the 3D sensor.

Example 16 may include the apparatus of Example 15, wherein the IR projector is to output one of a structured IR light pattern or a time-of-flight IR light pattern.

Example 17 may include the apparatus of Example 13, wherein the request handler is to detect a preview request to conduct the short range depth capture and the mode controller is to activate the IR projector at the second power level for the second duration in response to the preview request.

Example 18 may include the apparatus of Example 13, wherein the IR projector is a dedicated high power IR projector and the apparatus further includes a dedicated low power IR projector, the request handler is to detect a preview request to conduct the short range depth capture, and the mode controller is to activate the dedicated low power IR projector at the second power level for the second duration in response to the preview request.

Example 19 may include a method of operating a depth illumination apparatus, comprising detecting a snapshot request to conduct a long range depth capture, wherein the snapshot request is associated with a short range depth capture, and activating an infrared (IR) projector at a first power level for a first duration in response to the snapshot request, wherein the first power level is greater than a second power level corresponding to the short range depth capture and the first duration is less than a second duration corresponding to the short range depth capture.

Example 20 may include the method of Example 19, wherein the long range depth capture corresponds to a still depth capture event and the short range depth capture corresponds a video capture event.

Example 21 may include the method of any one of Examples 19 or 20, wherein the snapshot request is detected based on a signal from a remote device and the IR projector outputs a stereoscopic IR light pattern.

Example 22 may include the method of any one of Examples 19 or 20, wherein the snapshot request is detected based on a signal from a local component and the method further includes conducting a synchronization between a pattern of IR light output from the IR projector and a pattern of IR light detected by a three-dimensional (3D) sensor.

Example 23 may include the method of Example 22, wherein the IR projector outputs one of a structured IR light pattern or a time-of-flight IR light pattern.

Example 24 may include the method of Example 19, further including detecting a preview request to conduct the short range depth capture, and activating the IR projector at the second power level for the second duration in response to the preview request.

Example 25 may include the method of Example 19, wherein the IR projector is a dedicated high power IR projector and the method further includes detecting a preview request to conduct the short range depth capture, and activating a dedicated low power IR projector at the second power level for the second duration in response to the preview request.

Example 26 may include a depth illumination apparatus comprising means for detecting a snapshot request to conduct a long range depth capture, wherein the snapshot request is associated with a short range depth capture, and means for activating an infrared (IR) projector at a first power level for a first duration in response to the snapshot request, wherein the first power level is greater than a second power level corresponding to the short range depth capture and the first duration is less than a second duration corresponding to the short range depth capture.

Example 27 may include the apparatus of Example 26, wherein the long range depth capture is to correspond to a still depth capture event and the short range depth capture is to correspond a video capture event.

Example 28 may include the apparatus of any one of Examples 26 or 27, wherein the snapshot request is to be detected based on a signal from a remote device and the IR projector outputs a stereoscopic IR light pattern.

Example 29 may include the apparatus of any one of Examples 26 or 27, wherein the snapshot request is to be detected based on a signal from a local component and the method further includes conducting a synchronization between a pattern of IR light output from the IR projector and a pattern of IR light detected by a three-dimensional (3D) sensor.

Example 30 may include the apparatus of Example 29, wherein the IR projector is to output one of a structured IR light pattern or a time-of-flight IR light pattern.

Example 31 may include the apparatus of Example 26, further including means for detecting a preview request to conduct the short range depth capture, and means for activating the IR projector at the second power level for the second duration in response to the preview request.

Example 32 may include the apparatus of Example 26, wherein the IR projector is a dedicated high power IR projector and the apparatus further includes means for detecting a preview request to conduct the short range depth capture, and means for activating a dedicated low power IR projector at the second power level for the second duration in response to the preview request.

Technology described herein may therefore increase the power of emitted IR energy for a very short period of time in order to enable the collection of longer range depth information while minimizing the impact on power consumption. Accordingly, a single computing system may support both lengthy depth-enhanced video sessions and high quality depth-enhanced snapshots, while consuming low power. Such an approach may be particularly advantageous in mobile battery enabled platforms such as video cameras, smart phones, tablet computers, laptops, drones, etc. Moreover, the high power enhanced IR projector may be manufactured as a standalone peripheral that maximizes flexibility. For example, in close-range indoor scenes, usage of the enhanced IR projector may be bypassed, whereas in indoor large rooms a medium powered IR projector might be deployed. Indeed, in outdoor environments an even more powerful IR projector may be used to accurately capture depth information at long distances and in daylight. In yet another example, a robot may be equipped with a depth camera that operates in the low power mode most of the time and momentarily switches to the high power mode in order to perform specific tasks such as, for example, applying object recognition or glancing into an adjacent room.

As already noted, temporal synchronization between the emitted pattern and the patterns detected by the 3D sensor may be conducted if the patterns change dynamically. In cases that use static patterns, the high power IR projector may only receive an on-off signal from the computing system. In these implementations, the IR projectors may still output a specific IR pattern that matches each projector. Simply put, the technology described herein may improve the operation of photography-based computing systems in a manner that enables users to obtain longer range and higher quality depth images, which may in turn enable superior enhanced photography experiences.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
 a local component to issue a signal;
 an infrared (IR) projector;
 a request handler to:
  detect a snapshot request to conduct a long range depth capture based on the signal from the local component; and
  detect a preview request to conduct a short range depth capture;
 a mode controller communicatively coupled to the IR projector and the request handler, the mode controller to:
  activate the IR projector at a first power level for a first duration in response to the snapshot request, wherein the first power level is to be greater than a second power level corresponding to the short range depth capture and the first duration is to be less than a second duration corresponding to the short range depth capture; and
  activate at least one IR projector at the second power level for the second duration in response to the preview request;
 a three-dimensional (3D) sensor to detect a pattern of IR light; and
 a pattern synchronizer to conduct a synchronization between a pattern of IR light output from the IR projector and the pattern of light detected by the 3D sensor.

2. The apparatus of claim 1, wherein the IR projector is to output one of a structured IR light pattern or a time-of-flight IR light pattern.

3. The apparatus of claim 1, wherein the mode controller is to activate the IR projector at the second power level for the second duration in response to the preview request.

4. The apparatus of claim 1, wherein the IR projector is a dedicated high power IR projector and the apparatus further includes a dedicated low power IR projector, and the mode controller is to activate the dedicated low power IR projector at the second power level for the second duration in response to the preview request.

5. A system comprising:
a housing including a mobile form factor;
a battery port to supply power to the system; and
a depth illumination apparatus including,
an infrared (IR) projector,
a request handler to:
detect a snapshot request to conduct a long range depth capture, and
detect a preview request to conduct a short range depth capture, and
a mode controller communicatively coupled to the IR projector and the request handler, the mode controller to:
activate the IR projector at a first power level for a first duration in response to the snapshot request, wherein the first power level is to be greater than a second power level corresponding to the short range depth capture and the first duration is to be less than a second duration corresponding to the short range depth capture; and
activate at least one IR projector at the second power level for the second duration in response to the preview request.

6. The system of claim 5, wherein the long range depth capture is to correspond to a still depth capture event and the short range depth capture is to correspond to a video capture event.

7. The system of claim 5, wherein the snapshot request is to be detected based on a signal from a remote device and the IR projector is to output a stereoscopic IR light pattern.

8. The system of claim 5, wherein the depth illumination apparatus further includes:
a local component to issue a signal, wherein the snapshot request is to be detected based on the signal from the local component;
a three-dimensional (3D) sensor to detect a pattern of IR light; and
a pattern synchronizer to conduct a synchronization between a pattern of IR light output from the IR projector and the pattern of light detected by the 3D sensor.

9. The system of claim 8, wherein the IR projector is to output one of a structured IR light pattern or a time-of-flight IR light pattern.

10. The system of claim 5, wherein the mode controller is to activate the IR projector at the second power level for the second duration in response to the preview request.

11. The system of claim 5, wherein the IR projector is a dedicated high power IR projector and the depth illumination apparatus further includes a dedicated low power IR projector, and the mode controller is to activate the dedicated low power IR projector at the second power level for the second duration in response to the preview request.

12. An apparatus comprising:
an infrared (IR) projector;
a request handler to:
detect a snapshot request to conduct a long range depth capture; and
detect a preview request to conduct a short range depth capture; and
a mode controller communicatively coupled to the IR projector and the request handler, the mode controller to:
activate the IR projector at a first power level for a first duration in response to the snapshot request, wherein the first power level is to be greater than a second power level corresponding to the short range depth capture and the first duration is to be less than a second duration corresponding to the short range depth capture; and
activate at least one IR projector at the second power level for the second duration in response to the preview request.

13. The apparatus of claim 12, wherein the long range depth capture is to correspond to a still depth capture event and the short range depth capture is to correspond to a video capture event.

14. The apparatus of claim 12, wherein the snapshot request is to be detected based on a signal from a remote device and the IR projector is to output a stereoscopic IR light pattern.

15. The apparatus of claim 12, further including:
a local component to issue a signal, wherein the snapshot request is to be detected based on the signal from the local component;
a three-dimensional (3D) sensor to detect a pattern of IR light; and
a pattern synchronizer to conduct a synchronization between a pattern of IR light output from the IR projector and the pattern of light detected by the 3D sensor.

16. The apparatus of claim 15, wherein the IR projector is to output one of a structured IR light pattern or a time-of-flight IR light pattern.

17. The apparatus of claim 13, wherein the mode controller is to activate the IR projector at the second power level for the second duration in response to the preview request.

18. The apparatus of claim 13, wherein the IR projector is a dedicated high power IR projector and the apparatus further includes a dedicated low power IR projector and the mode controller is to activate the dedicated low power IR projector at the second power level for the second duration in response to the preview request.

19. A method comprising:
detecting a snapshot request to conduct a long range depth capture; and
detecting a preview request to conduct a short range depth capture;
activating an infrared (IR) projector at a first power level for a first duration in response to the snapshot request, wherein the first power level is greater than a second power level corresponding to the short range depth capture and the first duration is less than a second duration corresponding to the short range depth capture; and
activating at least one IR projector at the second power level for the second duration in response to the preview request.

20. The method of claim 19, wherein the long range depth capture corresponds to a still depth capture event and the short range depth capture corresponds a video capture event.

21. The method of claim 19, wherein the snapshot request is detected based on a signal from a remote device and the IR projector outputs a stereoscopic IR light pattern.

22. The method of claim 19, wherein the snapshot request is detected based on a signal from a local component and the method further includes conducting a synchronization between a pattern of IR light output from the IR projector and a pattern of IR light detected by a three-dimensional (3D) sensor.

23. The method of claim 22, wherein the IR projector outputs one of a structured IR light pattern or a time-of-flight IR light pattern.

24. The method of claim 19, further including activating the IR projector at the second power level for the second duration in response to the preview request.

25. The method of claim 19, wherein the IR projector is a dedicated high power IR projector and the method further includes activating a dedicated low power IR projector at the second power level for the second duration in response to the preview request.

\* \* \* \* \*